United States Patent
Chen

(10) Patent No.: US 11,087,443 B2
(45) Date of Patent: Aug. 10, 2021

(54) AUGMENTED REALITY SYSTEM AND COLOR COMPENSATION METHOD THEREOF

(71) Applicant: Wistron Corporation, New Taipei (TW)

(72) Inventor: Li-Jen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 14 days.

(21) Appl. No.: 16/183,743

(22) Filed: Nov. 8, 2018

(65) Prior Publication Data

US 2020/0027201 A1 Jan. 23, 2020

(30) Foreign Application Priority Data

Jul. 23, 2018 (TW) .................................. 107125351

(51) Int. Cl.
*G06T 5/00* (2006.01)
*G06T 7/90* (2017.01)
*G06T 15/20* (2011.01)
*G06F 3/01* (2006.01)

(52) U.S. Cl.
CPC .............. *G06T 5/009* (2013.01); *G06F 3/013* (2013.01); *G06T 7/90* (2017.01); *G06T 15/205* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 2002/0044152 A1 | 4/2002 | Abbott, III et al. | |
| 2007/0115484 A1* | 5/2007 | Huang | G01B 11/2527 356/604 |
| 2008/0298688 A1* | 12/2008 | Cheong | G06K 7/14 382/224 |
| 2012/0120088 A1 | 5/2012 | Kitahara | |
| 2015/0262427 A1 | 9/2015 | Kuranoshita | |

(Continued)

FOREIGN PATENT DOCUMENTS

TW 201626046 7/2016

OTHER PUBLICATIONS

"Office Action of Taiwan Counterpart Application", dated Mar. 28, 2019, p. 1-p. 6.

(Continued)

*Primary Examiner* — Tize Ma
(74) *Attorney, Agent, or Firm* — JCIPRNET

(57) ABSTRACT

An augmented reality system and a color compensation method thereof are proposed. The method is applicable to an augmented reality system having a display and an image sensor and include the following steps. A preset object position of a virtual object with respect to an actual scene is set. An image of the actual scene is captured by using the image sensor, and the image of the actual scene is mapped to a field of view of the display to generate a background image with respect to the field of view of the display. Color compensation is performed on the virtual object according to a background overlapping region corresponding to the preset object position in the background image to generate an adjusted virtual object, and the adjusted virtual object is displayed on the display according to the preset object position.

21 Claims, 10 Drawing Sheets

(56) References Cited

U.S. PATENT DOCUMENTS

| | | | |
|---|---|---|---|
| 2016/0284132 A1 | 9/2016 | Kim et al. | |
| 2017/0122725 A1* | 5/2017 | Yeoh | G09G 3/003 |
| 2017/0243406 A1 | 8/2017 | Yamazaki | |
| 2017/0270707 A1 | 9/2017 | Kass | |
| 2017/0301145 A1 | 10/2017 | Miller | |
| 2017/0363897 A1* | 12/2017 | Martin | E06B 9/24 |
| 2020/0193648 A1* | 6/2020 | Wyble | G06T 7/90 |

OTHER PUBLICATIONS

"Office Action of India Counterpart Application", dated Jan. 25, 2021, p. 1-p. 7.

\* cited by examiner

AUGMENTED REALITY SYSTEM AND COLOR COMPENSATION METHOD THEREOF

CROSS-REFERENCE TO RELATED APPLICATION

This application claims the priority benefit of Taiwan application Ser. No. 107125351, filed on Jul. 23, 2018. The entirety of the above-mentioned patent application is hereby incorporated by reference herein and made a part of this specification.

BACKGROUND

1. Field of the Disclosure

The disclosure relates to a technique for color processing on virtual images, and more particularly, to an augmented reality (AR) system using a virtual image color processing technology and a color compensation method thereof.

2. Description of Related Art

With the rapid development of image processing technology and spatial positioning recognition technology, the market has continuously introduced various virtual reality (VR), augmented reality (AR), mixed reality (MR) and other types of head-mounted devices (HMDs) and their application software programs. For example, the AR glasses are electronic devices that project or display virtual images on specially-designed transparent lenses so that the user is able to simultaneously view the real environment and virtual images through the AR glasses. In order to achieve the above feature, the lenses of the AR glasses are transparent or translucent with a transmittance of about 70%, and the color of the virtual images on the lenses is thus affected by the environment. When a virtual image is projected on a specific area, and the color of the virtual image is different from the color of an actual background image of the specific area, such virtual image viewed by the user is superimposed on the color of the background.

For example, if a virtual image is superimposed on a white or monochrome actual background image, the color of the image viewed by the user is more natural. However, if a virtual image is superimposed on the actual background image of multiple colors, the color of the virtual image would be mixed with the color of the actual background image and deviate from the color that should be presented.

SUMMARY

The disclosure provides an AR system and a color compensation method thereof.

In an embodiment of the disclosure, the method is applicable to an AR system having a display pervious to light and an image sensor. The method is applicable to an augmented reality system having a light-transmissive display and an image sensor and include the following steps. A preset object position of a virtual object with respect to an actual scene is set. An image of the actual scene is captured by using the image sensor, and the image of the actual scene is mapped to a field of view (FOV) of the display to generate a background image with respect to the FOV of the display. Color compensation is performed on the virtual object according to a background overlapping region corresponding to the preset object position in the background image to generate an adjusted virtual object, and the adjusted virtual object is displayed on the display according to the preset object position.

In an embodiment of the disclosure, the system includes an image sensor, a light-transmissive display, and a computing device, where the computing device is connected to the image sensor and the display. The image sensor is configured to capture images. The display is configured to display virtual objects. The computing device is configured to set the preset object position of the virtual object with respect to the actual scene, capture an image of the actual scene by using the image sensor, map the image of the actual scene to a FOV of the display to generate a background image with respect to the FOV of the display, perform color compensation on the virtual object according to a background overlapping region corresponding to the preset object position in the background image to generate an adjusted virtual object, and display the adjusted virtual object on the display according to the preset object position.

In an embodiment of the disclosure, the method is applicable to an electronic device having a light-transmissive display capable of displaying a virtual object and an image sensor. The method includes the following steps. An image of the actual scene is captured by using the image sensor to generate a background image. The virtual object of the display and the background image are compared to determine an actual overlapping region of the virtual object and the background image. A relationship between a background pass-through color brightness of the actual overlapping region of the background image after passing through the display and an original color brightness of the virtual object is determined to accordingly adjust the original color brightness of the virtual object to a calibrated color brightness.

In order to make the aforementioned features and advantages of the disclosure more comprehensible, embodiments accompanying drawings are described in detail below.

DESCRIPTION OF THE EMBODIMENTS

Figure 1:
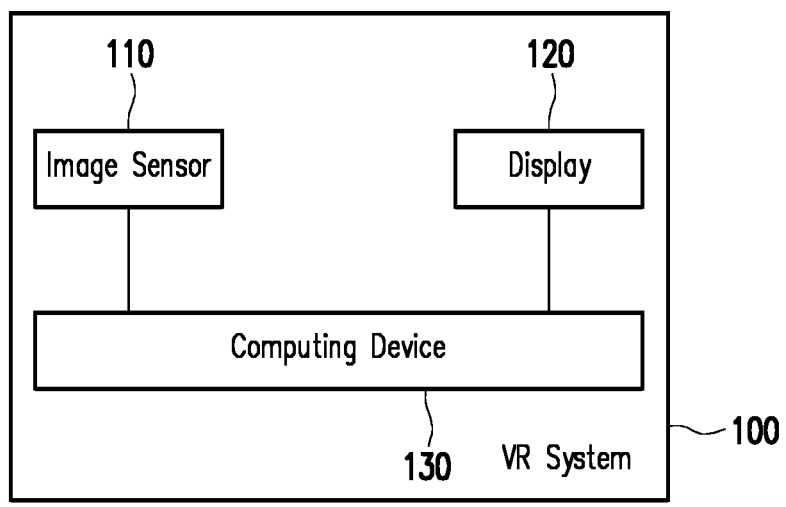
FIG. 1 is a schematic diagram of an AR system according to an embodiment of the disclosure.

Some embodiments of the disclosure will be described in detail below with reference to the accompanying drawings. In the following description, the same reference numerals will be given to the same or similar elements. These embodiments are only a part of the disclosure and do not disclose all of the embodiments of the disclosure. Rather, these embodiments are merely examples of methods and systems within the scope of claims of the disclosure.

Figure 2A:
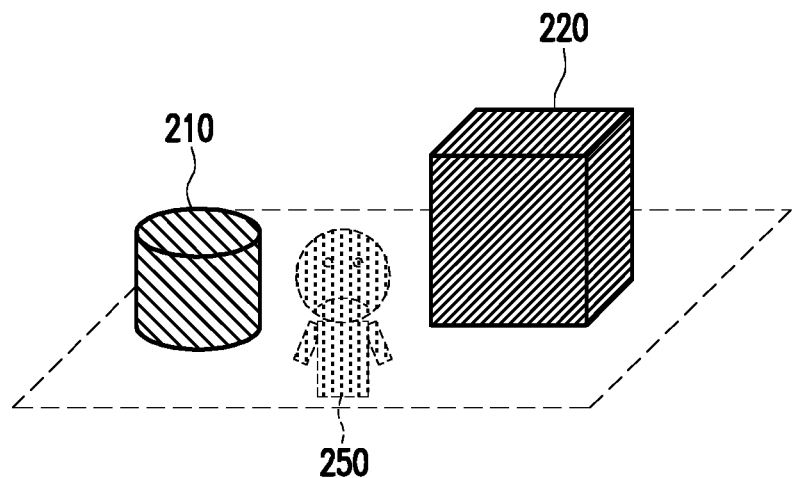
FIG. 2A is a schematic diagram of a display screen of conventional AR glasses.
Figure 2B:
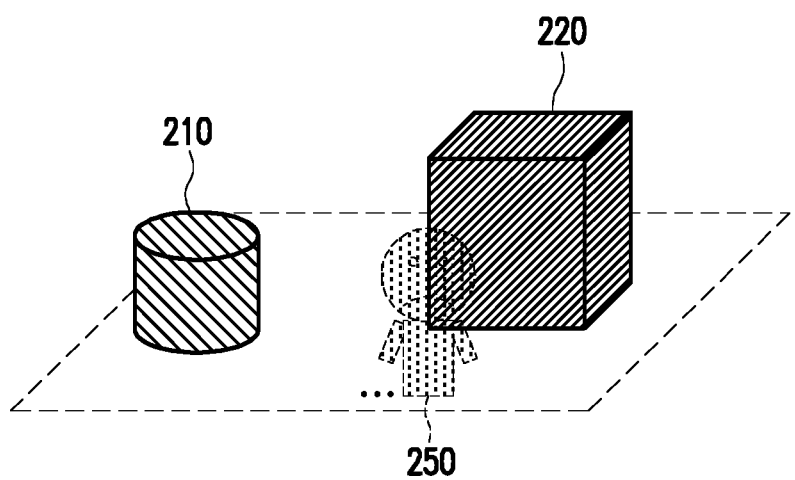
FIG. 2B is a schematic diagram of a display screen of conventional AR glasses.

FIG. 1 is a schematic diagram of an AR system according to an embodiment of the disclosure. However, this is merely for illustrative purposes and is not intended to limit the disclosure. All components of the AR system and their configurations are first introduced in FIG. 1. The functionalities of the components are disclosed in more detail in conjunction with FIG. 2.

Referring to FIG. 1, an AR system 100 at least includes an image sensor 110, a light-transmissive display 120, and a computing device 130. The computing device 130 is electrically connected to the image sensor 110 and the display 120 directly or indirectly.

The image sensor 110 is configured to capture an image and includes a camera lens having a lens and a photosensitive element. The photosensitive element is configured to sense the intensity of light entering the lens to generate an image. The photosensitive element may be, for example, a charge coupled device (CCD), a complementary metal-oxide semiconductor (CMOS) element, or the like. The disclosure is not limited in this regard.

The display 120 is configured to display a virtual object by a display technology such as liquid crystal, organic light emitting diode, electronic ink, or projection, and has a translucent or transparent optical lens. Therefore, the content viewed by a user through the display 120 will be an actual scene superimposed by the virtual object.

The computing device 130 is configured to control the operation of the AR system 100, and includes a memory and a processor. The memory may be, for example, any type of fixed or removable random access memory (RAM), read-only memory (ROM), flash memory, hard disc or other similar devices, integrated circuits, and any combinations thereof. The processor may be, for example, a central processing unit (CPU), an application processor (AP), or other programmable general purpose or special purpose microprocessor, digital signal, processor (DSP), image signal processor (ISP), graphics processing unit (GPU) or other similar devices, integrated circuits, and any combinations thereof.

In the embodiment, the AR system 100 may be an all-in-one system which may be implemented as an integrated head-mounted display such as AR glasses, and AR glasses will be used for illustration in the following description. In another embodiment, the image sensor 110 and the display 120 may be implemented as a head mounted display, and the computing device 130 may be implemented as a computer system. The head-mounted display and the computer system may form a separate system, and data is transmitted via wired or wirelessly through their respective communication interfaces.

Figure 2C:
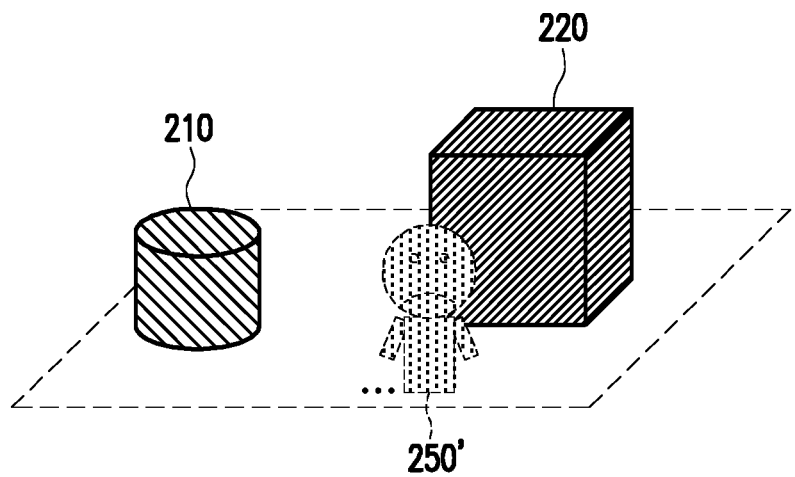
FIG. 2C is a schematic diagram of a display screen of an AR system according to an embodiment of the disclosure.

In the case of general AR glasses, the color of an image viewed by the user is normal only when a virtual object is superimposed on a white or monochrome actual background image. Taking a display screen of conventional AR glasses as illustrated in a schematic view in FIG. 2A as an example, it is assumed that an actual background image 210 and an actual background image 220 are actual background images having multiple colors. When a virtual object 250 is not imaged on the actual background image 210 and the actual background image 220, an image color viewed by the user can be close to normal. However, taking a schematic diagram of the display screen of the conventional AR glasses as an example in FIG. 2B, when the virtual object 250 is imaged on the actual background image 220, the colors of the two may be mixed together, and the color of actual background image 220 may pass through the right half portion of the virtual object 250, and the color of the virtual object 250 viewed by the user may thus be different from the color supposed to be. Therefore, the AR system 100 of the embodiment may perform color compensation on the virtual object 250 overlapping with the actual background image 220 so that the user would be able to view a virtual object 250' that is unaffected by the actual background image 220 through the display screen of the AR system 100 for different backgrounds as shown in FIG. 2C. Details of the color compensation implementation will be described in conjunction with the various elements of the AR system 100 in the following embodiments.

Figure 3:
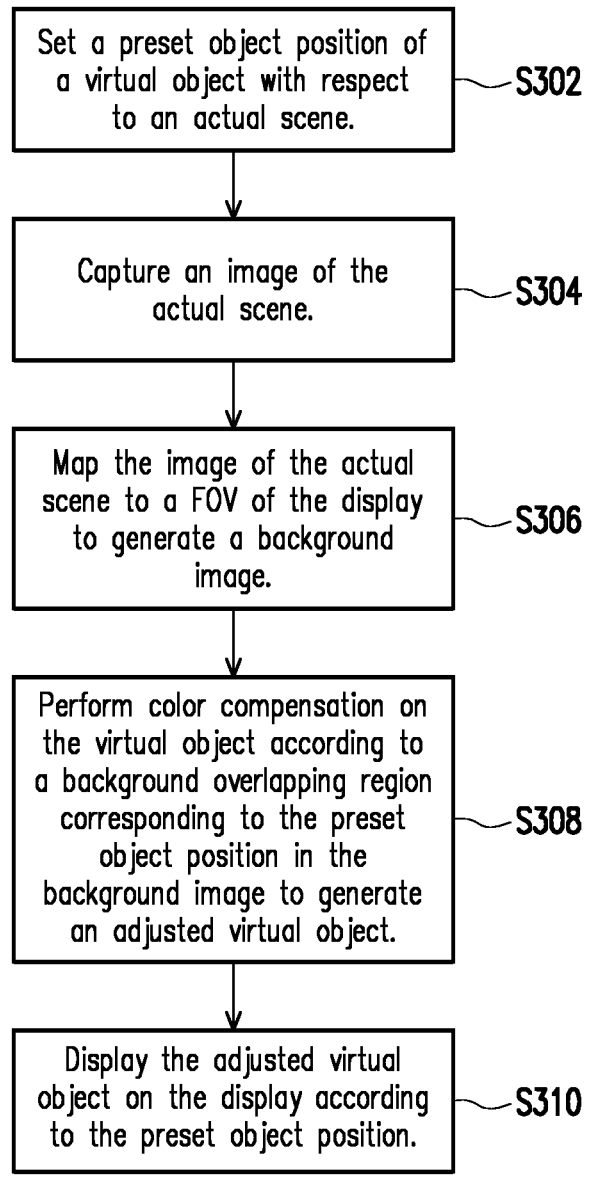
FIG. 3 is a flow chart of a color compensation method according to an embodiment of the disclosure.

FIG. 3 is a flowchart of a color compensation method according to an embodiment of the disclosure. The method flow of FIG. 3 can be implemented by the AR system 100 of FIG. 1.

Referring to both FIG. 1 and FIG. 3, the computing device 130 of the AR system 100 would set a preset object position of a virtual object with respect to an actual scene (step S302). Here, it is assumed that for the computing device 130, the appearance of the virtual object such as the size and the shape are known, i.e. stored in the memory of the computing device 130 in advance to be selected by the user or the computing device 130. On the other hand, the preset object position is the position of the virtual object with respect to the actual scene.

In order to subsequently render the virtual object at a more precise position, the preset object position may be represented by an absolute coordinate. In this embodiment, before setting the virtual object, the computing device 130 can use a simultaneous localization and mapping (SLAM) technology along with a depth map of the actual scene and an inertial measurement unit (IMU) to scan the actual scene to locate three-dimensional absolute coordinates of the actual scene. The computing device 130 can thereby set an absolute coordinate position of the virtual object in the actual scene.

The depth map may be generated by using the image sensor 110 in conjunction with a depth sensor (not shown) in a manner as known per se. The depth sensor is configured to detect depth information of the actual scene and can be categorized into an active depth sensor and a passive depth sensor. The active depth sensor can calculate the depth information of the actual scene by actively emitting a light source, infrared light, ultrasonic wave, laser, and so forth as a signal with time-of-flight (ToF) technology. On the other hand, the passive depth sensor may be, for example, another image sensor, and simultaneously captures images with the image sensor 110 from different angles of view. The depth information of the actual scene is calculated by using the disparity of the two captured images. However, in other embodiments, it is not excluded that the depth sensor may use a standard depth sensor to operate independently from the image sensor 110 to obtain depth information of the actual scene. Yet in other embodiments, the depth sensor with an image capturing feature may be used. That is, the depth sensor not only may generate the depth information for construction of a three-dimensional coordinate map, but also may output and transmit the captured actual scene image to the computing device 130 to perform the subsequent step S304. Accordingly, the "depth sensor" herein is a generalized abstract function mechanism and refers to a mechanism of detecting the depth information in a space. That is, the depth sensor may be a component independent from the image sensor 110, form an integrated depth sensor with the image sensor 110, or include all the features of the image sensor 110.

The IMU is a multi-axis motion sensor that may include a three-axis gyroscope and three-direction accelerometers to measure the angular velocity and the acceleration of the AR system 100 in three-dimensional space. The IMU may provide the angle of the AR system 100 and the moving distance within a short time span in real time. The operation unit 130 may use the depth map obtained by the AR system 100 as well as the posture and the moving distance of the AR system 100 to achieve the purpose of positioning in the actual scene through the SLAM technology and constructing the map for the actual scene.

Next, the computing device 130 would use the image sensor 110 to capture the image of the actual scene (step S304) and map the image of the actual scene to a FOV of the display 120 to generate a background image (step S306). In detail, the image of the actual scene is associated with a FOV of the image sensor 110, and the FOV of the display 120 is associated with the display area of the display 120 and the preset human eye position. It may be reasonably assumed that the disposed positions of the image sensor 110 and the display 120 are different, and the FOV of the image sensor 110 is larger than that of the display 120. The computing device 130 may first calculate an overlapping region between the FOV of the image sensor 110 and the FOV of the image sensor 110 (hereinafter referred to as "view overlapping region") and further map the view overlapping region to the entire FOV of the display 120.

Figure 4A:
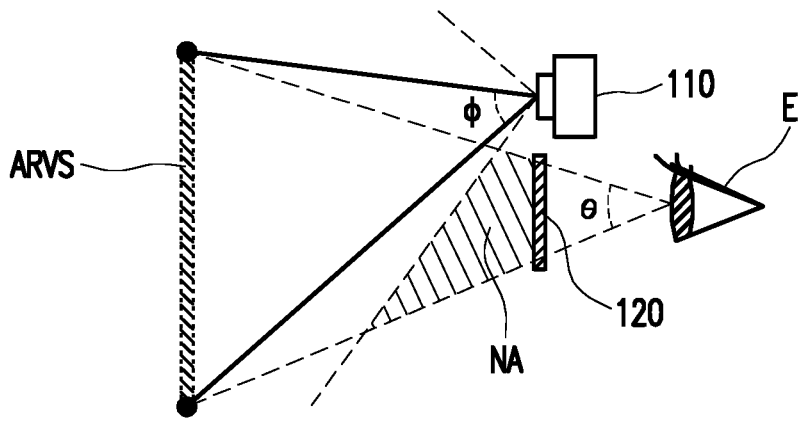
FIG. 4A is a schematic diagram of a view overlapping region according to an embodiment of the disclosure.

Specifically, FIG. 4A is a schematic diagram of a view overlapping region according to an embodiment of the disclosure. From the perspective of the display 120, a region ARVS is a scene (i.e., the FOV of the display 120) that can be viewed through the display 120 from a viewing angle θ at a preset human eye position E. From the perspective of the image sensor 110, the region ARVS is a scene captured by the viewing angle Φ, which is included in the FOV of the image sensor 110.

In other words, the region ARVS is an overlapping region of the FOV of the image sensor 110 and the FOV of the display 120, that is, the aforesaid view overlapping region. The computing device 130 may define the view overlapping region by calculating the viewing angle Φ from the image of the actual scene captured by the image sensor 110. The view overlapping region is then mapped back to the entire FOV of the display 120 to generate a background image corresponding to the FOV of the display 120. It should be noted that, since the different disposed positions of the image sensor 110 and the display 120 and since the FOV of the image sensor 110 is larger than the FOV of the display 120, a neighboring area NA of the display 120 is not covered. The neighboring area NA is not processed in the embodiment. An approach of how to obtain the view overlapping region from the actual scene image will be explained hereafter.

Figure 4B:
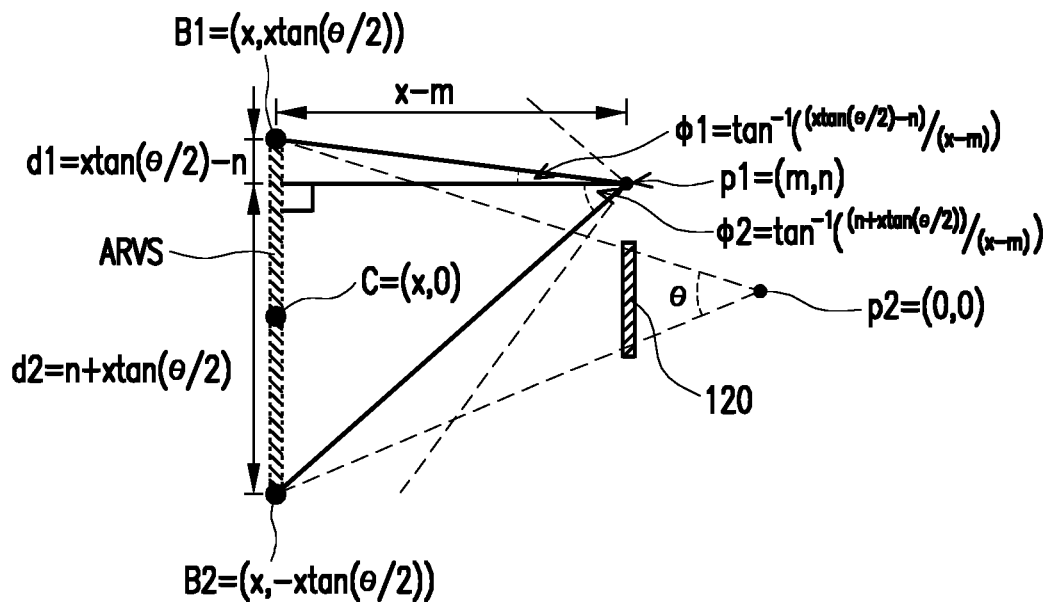
FIG. 4B is a schematic diagram of a view overlapping region with respect to a vertical direction according to an embodiment of the disclosure.

FIG. 4B is a schematic diagram of a view overlapping region with respect to a vertical direction according to an embodiment of the disclosure. In FIG. 4B, since a disposed position p1=(m,n) of the image sensor 110, a preset human eye position p2=(0,0) and a viewing angle θ at a preset human eye position p2 with respect to the display 120 are known, the computing device 130 can calculate the vertical viewing angle (Φ1+Φ2) of the image sensor 110 with respect to the view overlapping region ARVS from different distances x between the view overlapping region ARVS and the preset human eye position p2, i.e., different distances x−m between the view overlapping region ARVS and the disposed position p1 of the image sensor 110. Here, a vertical center point position of the view overlapping region ARVS is C=(x, 0), and vertical endpoints of the view overlapping region ARVS is B1=(x, x tan(θ/2)) and B2=(x, −x tan(θ/2)), so d1=x tan(θ/2)−n and d2=n+x tan(θ/2) can be further calculated. (Φ1+Φ2) may be thus obtained by trigonometry, where:

$$\Phi1=\tan^{-1}((x\tan(\theta/2)-n)/(x-m))$$

$$\Phi2=\tan^{-1}((n+x\tan(\theta/2))/(x-m))$$

Figure 4C:
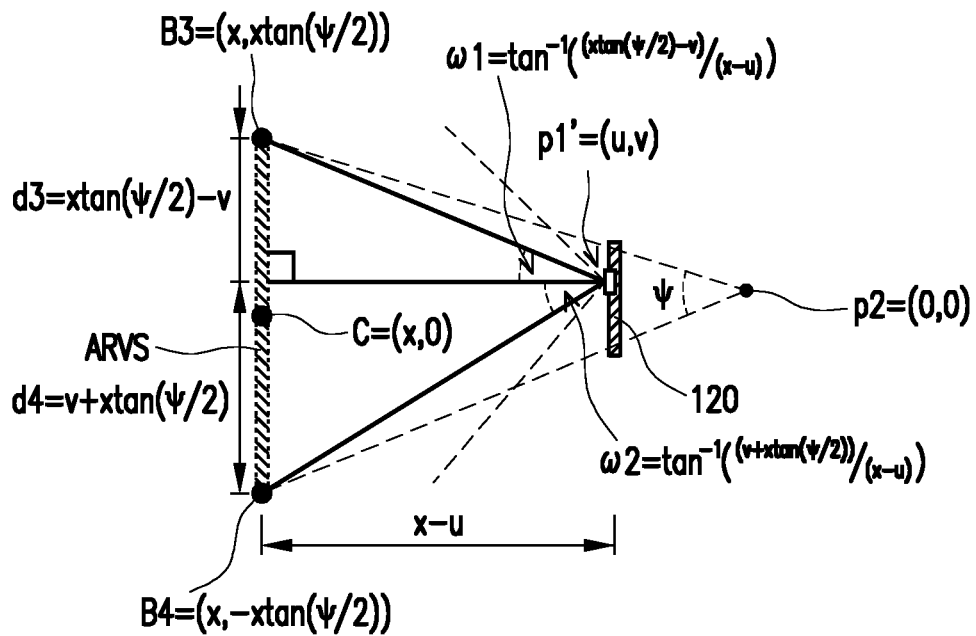
FIG. 4C is a schematic diagram of a view overlapping region with respect to a horizontal direction according to an embodiment of the disclosure.

FIG. 4C is a schematic diagram of a view overlapping region with respect to a horizontal direction according to an embodiment of the disclosure. In FIG. 4C, since a disposed position p1'=(u,v) of the image sensor 110, a preset human eye position p2'=(0,0) and a viewing angle ψ at a preset human eye position p2' with respect to the display 120 are known, the computing device 130 can calculate the vertical viewing angle (ω1+ω2) of the image sensor 110 with respect to the view overlapping region ARVS from different distances x between the view overlapping region ARVS and the preset human eye position p2', i.e., different distances x−u between the view overlapping region ARVS and the disposed position p1' of the image sensor 110. Here, a horizontal center point position of the view overlapping region ARVS is C=(x, 0), and horizontal endpoints of the view overlapping region ARVS is B3=(x, x tan(ψ/2)) and B4=(x, −x tan(ψ/2)), so d3=x tan(ψ/2)−v and d4=v+x tan(ψ/2) can be further calculated. (ω1+ω2) may be thus obtained by trigonometry, where:

$$\omega1=\tan^{-1}((x\tan(\psi/2)-v)/(x-u))$$

$$\omega2=\tan^{-1}((v+x\tan(\psi/2))/(x-u))$$

Figure 4D:
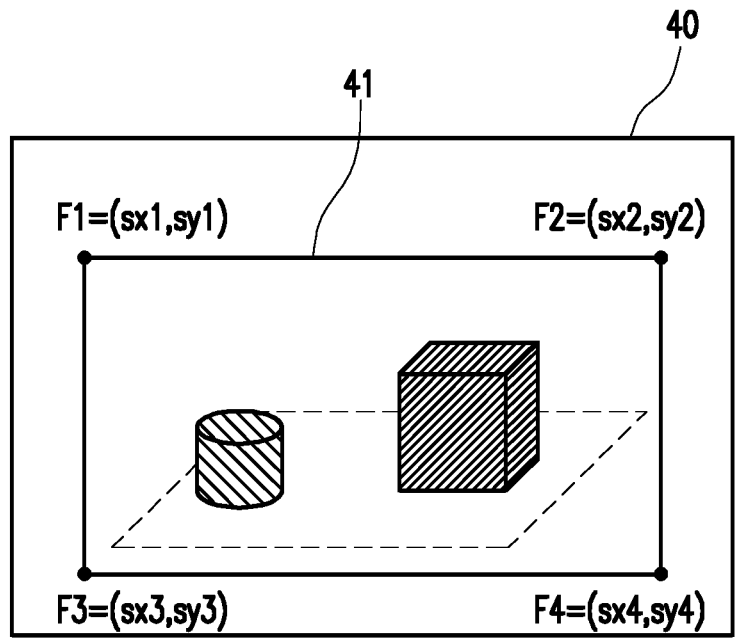
FIG. 4D is a schematic diagram of a FOV of an image sensor according to an embodiment of the disclosure.

Next, for each different distance, the computing device 130 may obtain a range covered by a vertical viewing angle and a horizontal viewing angle from the FOV of the image sensor 110 and then set the obtained range as the view overlapping region. Taking a FOV 40 of the image sensor 110 as illustrated in FIG. 4D according to an embodiment of the disclosure as an example, a FOV 41 of the display 120 is a region defined by four endpoints of F1=(sx1, sy1), F2=(sx2, sy2), F3=(sx3, sy3) and F4=(sx4, sy4). That is, the FOV 41 is also the view overlapping region.

Figure 4E:
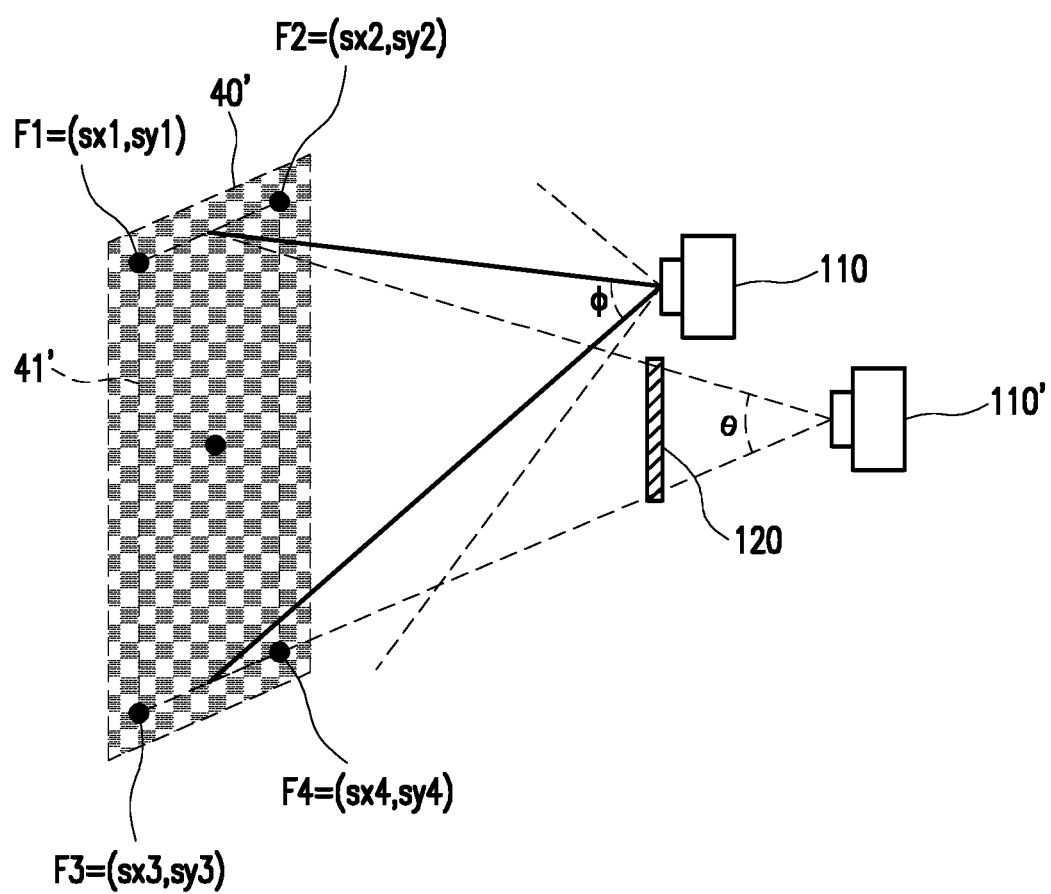
FIG. 4E is a schematic diagram of a calibration board according to an embodiment of the disclosure.

In another embodiment, another image sensor with a greater FOV than the display 120 may be set at the preset human eye position in advance during an offline stage. A calibration board having a reference pattern (e.g., a checkerboard) is disposed at a different distance with respect to the display 120, where the size of the calibration board is larger than the FOV of the display 120. Taking the calibration board 40' as illustrated in FIG. 4E according to an embodiment of the disclosure as an example, the computing device 130 can utilize the image sensor 110' located at the preset human eye position to capture a region 41' covered by the FOV of the display 120, i.e. the region defined by four endpoints of F1=(sx1, sy1), F2=(sx2, sy2), F3=(sx3, sy3) and F4=(sx4, sy4). That is, the FOV 41' is also the view overlapping region.

Figure 5:
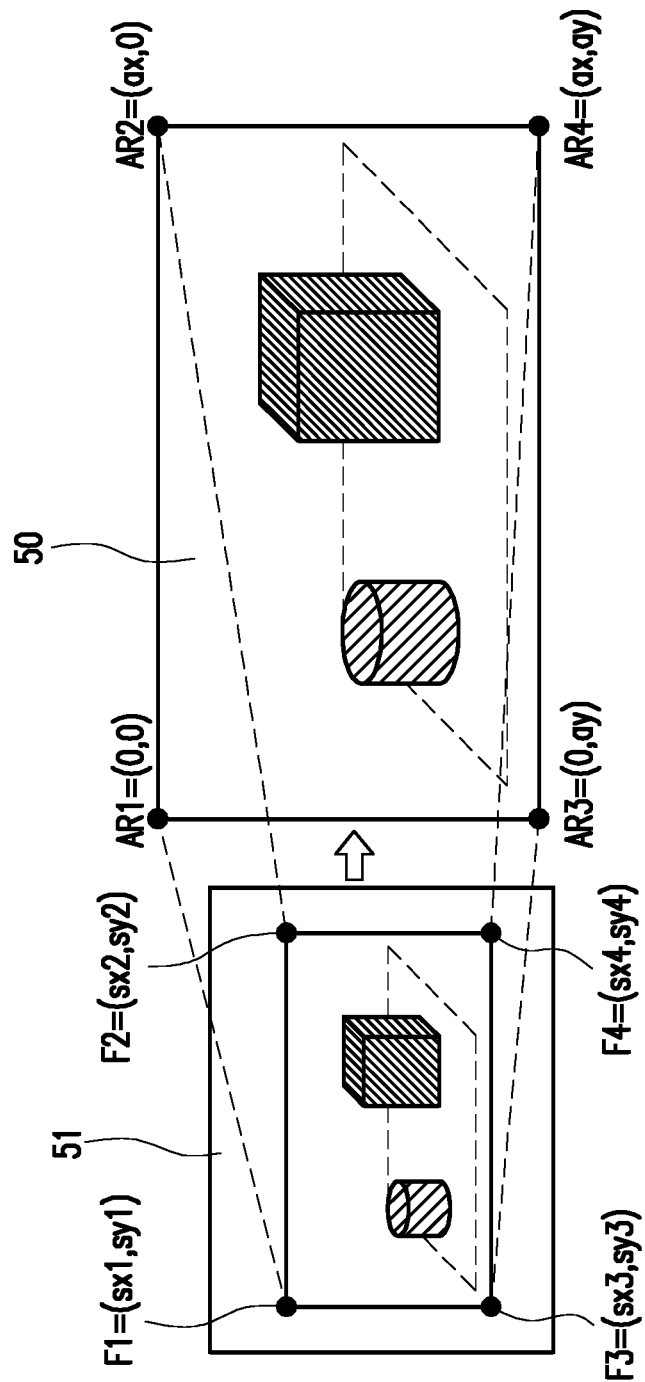
FIG. 5 is a schematic diagram of a FOV of an image sensor and a FOV of the display according to an embodiment of the disclosure.

After obtaining the view overlapping region of the image sensor 110 and the display 120, the computing device 130 may directly define the FOV of the display 120 from the FOV of the image sensor 130. Taking the FOV of the image sensor 130 and the FOV of the display 120 as illustrated in FIG. 5 according to an embodiment of the disclosure as an example, the computing device 130 may perform image resizing and image wrapping on the view overlapping region within the FOV 51 of the image sensor 110 (i.e., the region defined by F1=(sx1, sy1), F2=(sx2, sy2), F3=(sx3, sy3) and F4=(sx4, sy4)) for correcting the positional difference caused by the difference in angle or resolution between the image sensor 110 and the display 120 to obtain the processed image as a background image 50. Herein, F1=(sx1, sy1), F2=(sx2, sy2), F3=(sx3, sy3) and F4=(sx4, sy4) are respectively mapped to AR1=(0,0), AR2=(ax, 0), AR3=(0, ay) and AR4=(ax, ay).

Figure 6:
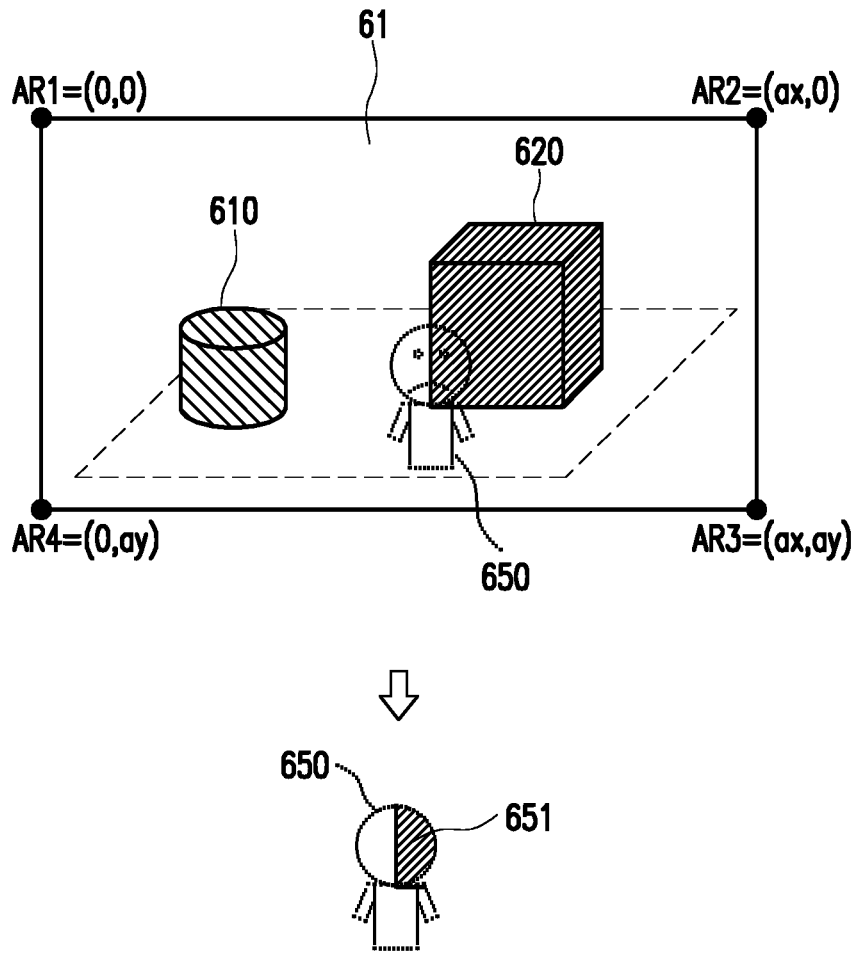
FIG. 6 is a schematic diagram of a background image and a virtual object according to an embodiment of the disclosure.

Referring back to FIG. 3, the computing device 130 would perform color compensation on the virtual object according to a background overlapping region corresponding to the preset object position in the background image to generate an adjusted virtual object (step S308). To be specific, taking a background image and a virtual object as illustrated in FIG. 6 according to an embodiment of the disclosure as an example, a background image 61 defined by AR1=(0,0), AR2=(ax, 0), AR3=(0, ay) and AR4=(ax, ay) includes an actual background image 610 and an actual background image 620. The computing device 130 may be able to know that an object overlapping region 651 of the virtual object 650 would overlap with the actual background image 620, so color compensation would be performed on the object overlapping region 651.

In the present embodiment, the computing device 130 may perform color compensation on the virtual object according to the brightness (luminance, in nit) of the virtual object and the brightness of the actual overlapping region corresponding to the background overlapping region in the actual scene after passing through the display 120. In detail, as described above, since the display 120 is light-transmissive, a portion of the actual scene may pass through the display 120, and a transmissive amount, a transmittance of the display 120, an ambient brightness in the actual scene, and the color of the virtual object are associated. Here, the computing device 130 can compensate the ambient brightness according to a gain value and an exposure time of the auto-exposure (AE) used by the image sensor 110. When the gain value is higher and the exposure time is longer, it means that the ambient is darker and the transmissive intensity is lower, and it also means that the amounts of brightness adjustment and interval compensation of the display 120 are greater. Conversely, when the gain value is lower and the exposure time is shorter, it means that the ambient is brighter and the transmissive intensity is higher, and it also means that the amounts of brightness adjustment and interval compensation of the display 120 are lesser. In another embodiment of the disclosure, the AR system 100 may also be provided with a light sensor independent of the image sensor 110 to detect and obtain ambient brightness values.

For better comprehension, the details of color compensation will be explained hereafter for a single pixel of a virtual object, and other pixels may be deduced in a similar fashion. It is assumed that an original color of an original virtual object can be expressed as Original(r,g,b). After a brightness of the original color displayed by the display 120 is multiplied by L, a color brightness of the virtual object received by both eyes is (hr, hg, hb), which can be expressed by the following formula:

$$\begin{bmatrix} hr \\ hg \\ hb \end{bmatrix} = L \times \begin{bmatrix} r \\ g \\ b \end{bmatrix}$$

Herein, L represents the multiplication of the display brightness of the display 120 and the original color. When the brightness of the display 120 is darker, the value of L is lower, and vice versa. In addition, the characteristics of different displays may also have different multiplications for three channels of the original color. Here, the background color brightness of the actual overlapping region corresponding to the virtual object can be expressed as (hbr, hbg, hbb). The color brightness of the actual overlapping region after passing through the display 120 is estimated to be proportional to the ambient brightness, that is, inversely proportional to the gain value and the exposure time. Therefore, a background pass-through color brightness (ehbr, ehbg, ehbb) of the actual overlapping region after passing through the display 120 to the eyes may be estimated by the following formula expressed below:

$$\begin{bmatrix} ehbr \\ ehbg \\ ehbb \end{bmatrix} = C \begin{bmatrix} hbr \\ hbg \\ hbb \end{bmatrix}$$

Herein, C is associated with ambient brightness or is associated with both the ambient brightness and the transmittance of display 120, such as:

$$C = \frac{a}{AE\_gain \times AE\_time}$$

Herein, a is an empirical constant value or a variable multiplied by the transmittance of the display 120. In addition, the computing device 130 can pre-store, for example, a corresponding table as illustrated in Table 1 below to obtain C.

| AE_gain × AE_time | C |
|---|---|
| 1 | 1000 |
| 2 | 900 |
| 3 | 840 |
| ... | ... |
| 2000 | 50 |

Since the background pass-through color brightness (ehbr, ehbg, ehbb) overlaps with the original color brightness (hr, hg, hb) of the virtual object, a visual color brightness (er, eg, eb) that the eyes would receive is as follows, $$\begin{bmatrix} er \\ eg \\ eb \end{bmatrix} \cong \begin{bmatrix} ehbr + hr \\ ehbg + hg \\ ehbb + hb \end{bmatrix} = C \begin{bmatrix} hbr \\ hbg \\ hbb \end{bmatrix} + \begin{bmatrix} hr \\ hg \\ hb \end{bmatrix}$$

Herein, the original color brightness (hr, hg, hb) of the original virtual object should be adjusted to a corrected color brightness (cr, cg, cb), so that the actual visual color brightness (er, eg, eb) received by the eyes may be the same as the original color brightness (hr, hg, hb) of the original virtual object, as represented by the following formula, $$\begin{bmatrix} er \\ eg \\ eb \end{bmatrix} \cong \begin{bmatrix} hr \\ hg \\ hb \end{bmatrix} = C \begin{bmatrix} hbr \\ hbg \\ hbb \end{bmatrix} + \begin{bmatrix} cr \\ cg \\ cb \end{bmatrix}$$

$$\begin{bmatrix} cr \\ cg \\ cb \end{bmatrix} = \begin{bmatrix} hr \\ hg \\ hb \end{bmatrix} - C \begin{bmatrix} hbr \\ hbg \\ hbb \end{bmatrix}$$

That is to say, the corrected color brightness of the color-compensated virtual object should be the difference between the original color brightness of the virtual object and the background pass-through color brightness of the actual overlapping region after passing through the display 120.

It should be noted that, when the ambient is too bright, it will cause the background pass-through color brightness $$C \begin{bmatrix} hbr \\ hbg \\ hbb \end{bmatrix}$$

of the actual overlapping region after passing through the display 120 to the eyes to be brighter than the original color brightness (hr, hg, hb) of the virtual object. However, the display 120 is a translucent material and cannot absorb light, and therefore the corrected color brightness (cr, cg, cb) after color compensation cannot be less than 0. At this point, only the overall corrected color brightness (cr, cg, cb) can be improved, and an upper limit should be set for the corrected color brightness (cr, cg, cb) due to the brightness range of the display 120. Therefore, the computing device 130 may adjust the corrected color of the color-compensated virtual object based on the flowchart of the brightness adjusting methods as illustrated in FIG. 7 and FIG. 8 respectively according to an embodiment of the disclosure.

Figure 7:
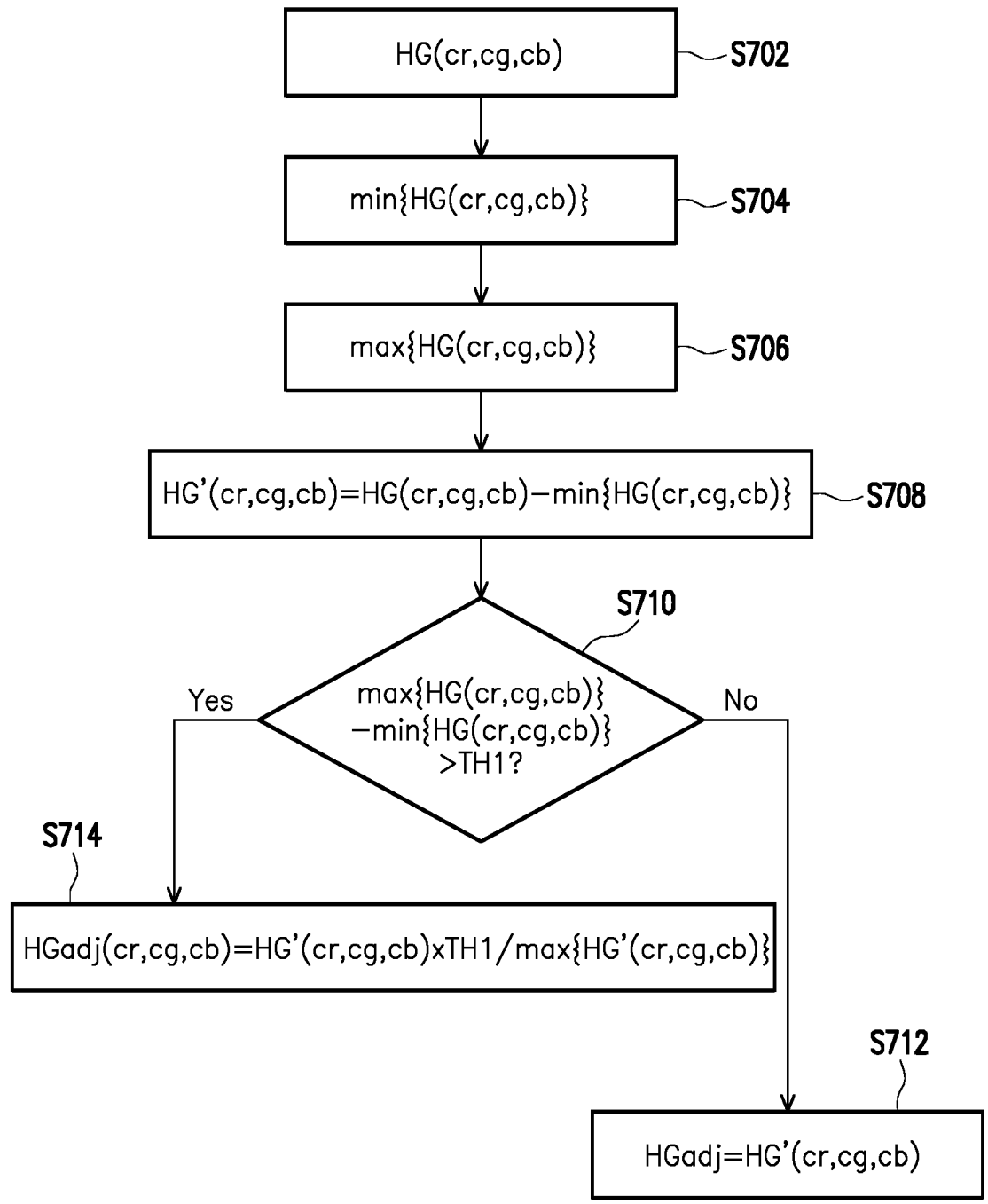
FIG. 7 is a flowchart of a brightness adjustment method according to an embodiment of the disclosure.
Figure 8:
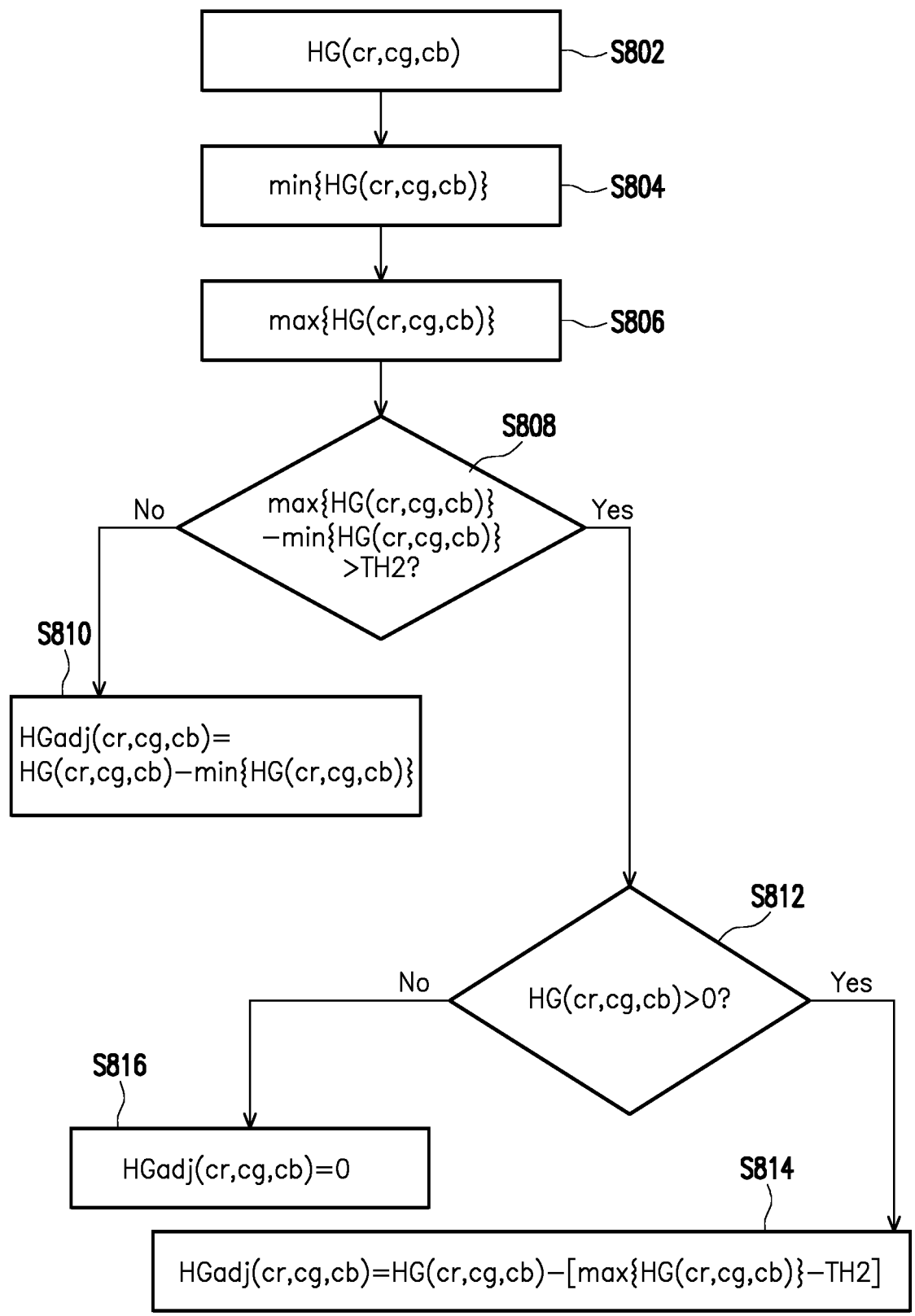
FIG. 8 is a flowchart of a brightness adjustment method according to another embodiment of the disclosure.

Referring first to FIG. 7, the computing device 130 would first obtain and set a brightness value HG(cr, cg, cb) of each pixel of a color-compensated virtual object as each compensated brightness value of the virtual object (step S702). Next, the computing device 130 would obtain a minimum compensated brightness value min{HG(cr, cg, cb)} and a maximum compensated brightness value max{HG(cr, cg, cb)} among the compensated brightness values (step S704 and Step S706, the two steps are not in a particular order). These two extreme values are used as a basis for adjusting all compensated brightness values.

Specifically, since the minimum brightness value may be negative, the computing device 130 may perform subtraction between each of the compensated brightness value HG(cr, cg, cb) and the minimum brightness value min{HG(cr, cg, cb)} to respectively generate a shifted brightness value HG'(cr, cg, cb) (step S708). The shifted brightness value HG'(cr, cg, cb) may be expressed as follows:

$$HG'(cr,cg,cb)=HG(cr,cg,cb)-\min\{HG(cr,cg,cb)\}$$

Next, the computing device 130 would determine whether the difference between the maximum compensation brightness value max{HG(cr, cg, cb)} and the minimum compensation brightness value min{HG(cr, cg, cb)} is greater than a first brightness threshold TH1 (step S710), i.e. determine whether the following conditional expression is satisfied:

$$\max\{HG(cr,cg,cb)\}-\min\{HG(cr,cg,cb)\}>TH1$$

Herein, the first brightness threshold TH1 may be, for example, 2000 nits. If the determination is negative, the computing device 130 would set each of the shifted brightness values HG'(cr, cg, cb) as the brightness value HGadj of each of the pixels of the adjusted virtual object (step S712). The HGadj may be expressed as follows:

$$HGadj=HG'(cr,cg,cb)$$

If the determination is affirmative, the computing device 130 would perform normalization on each of the shifted brightness value HG'(cr, cg, cb) according to the first brightness threshold TH1 and set each of the normalized shifted brightness values as the brightness value HGadj of each of the pixels of the adjusted virtual object. For example, the ratio between the first brightness threshold TH1 and the maximum shifted brightness value max{HG'(cr, cg, cb)} among all the shifted brightness values is used to perform normalization on all shifted brightness value to generate the brightness value HGadj of each pixel of the adjusted virtual object (step S714). The HGadj may be expressed as follows:

$$HGadj = HG'(cr, cg, cb) \times \frac{TH1}{\max\{HG'(cr, cg, cb)\}}$$

However, such approach may cause the color of the compensated virtual object to be faded where the ambient is too bright, and thus may not suitable for the actual scene where the ambient is too bright.

Referring to FIG. 8, similar to FIG. 7, the computing device 130 would first obtain and set a brightness value HG(cr, cg, cb) of each pixel of a color-compensated virtual object as each compensated brightness value of the virtual object (step S802). Next, the computing device 130 would obtain a minimum compensation brightness value min{HG(cr, cg, cb)} and a maximum compensation brightness value max{HG(cr, cg, cb)} among the compensation brightness values (step S804 and step S806, the two steps are not in a particular order). These two extreme values are used as a basis for adjusting all compensated brightness values.

Specifically, the computing device 130 would determine whether a difference between the maximum compensation brightness value max{HG(cr, cg, cb)} and the minimum compensation brightness value min{HG(cr, cg, cb)} is greater than a second brightness threshold TH2 (step S808), i.e. determine whether the following conditional expression is satisfied:

$$\max\{HG(cr,cg,cb)\}-\min\{HG(cr,cg,cb)\}>TH2$$

Herein, the second brightness threshold TH2 may be, for example, 2000 nits. If the determination is negative, the computing device 130 would perform subtraction between each of the compensated brightness value HG(cr, cg, cb) and the minimum compensation brightness value min{HG(cr, cg, cb)} from each compensation brightness value HG (cr, cg, cb) and set the subtraction result as a brightness values HGadj of each pixel of the adjusted virtual object (step S810). The HGadj may be expressed as follows:

$$HGadj(cr,cg,cb)=HG(cr,cg,cb)-\min\{HG(cr,cg,cb)\}$$

If the determination is affirmative, the computing device 130 would adjust each of the compensated brightness values HG(cr, cg, cb) to an interval between 0 and the second brightness threshold TH2. Specifically, for each of the compensated brightness values HG(cr, cg, cb), the computing device 130 would first determine whether each of which is greater than 0 (step S812). If the determination is affirmative, the computing device 130 would first calculate a difference between the maximum compensated brightness value max{HG(cr, cg, cb)} and the second brightness threshold TH2, perform shifting on the compensated brightness value according to the difference, and set the shifted compensated the brightness value as the brightness value HGadj of each pixel of the adjusted virtual object (step S814). The HGadj may be expressed as follows:

$$HGadj(cr,cg,cb) = HG(cr,cg,cb) - [\max\{HG(cr,cg,cb)\} - TH2]$$

If the determination is negative, the computing device 130 would set the brightness value HGadj of each of the pixels of the adjusted virtual object to 0 (step S816). That is, $$HGadj(cr,cg,cb) = 0$$

By adjusting the compensated brightness value to the interval between 0 and the second brightness threshold TH2, the color of the virtual object can still be preserved in an over-bright ambient, and the compensation on the over-bright portion would be discarded.

Referring back to FIG. 3, the computing device 130 would display the adjusted virtual object on the display 120 according to the preset object position (step S310). In detail, the overlapping portions of the FOV of the image sensor 110 and the FOV of the display 120 have been mapped in the previous steps. Before the computing device 130 performs imaging on a position corresponding to the preset predetermined position on the display 120, it would able to know the shape and color of the background overlapping region corresponding to the preset object position in the background image through the mapping relationship. The computing device 130 would further obtain the ambient brightness of the region viewed from the display 120 according to an auto-exposure feature, obtain the amount of light that may possibly pass through the display 120 in the ambient so as to adjust the brightness and color of the virtual object, and display the adjusted virtual object on the display 120. In the case of AR glasses, the adjusted virtual objects are respectively imaged on the left and right lenses. As a result, the color of the virtual object viewed by the user will be more consistent and will not be affected by the color of the background.

In summary, in the AR system and the color compensation method thereof proposed in the disclosure, color compensation would be performed on a virtual object according to a background overlapping region overlapped by a virtual object in an actual scene before the virtual object is displayed. Such approach would prevent the user from viewing a virtual object mixed with the actual background image color, and thereby the user experience would be improved.

In addition, the above-mentioned specification and the AR glasses or AR system mentioned in the patent application scope are only glasses or systems that adopt at least the generalized AR technology in terms of technical concept, and are not specifically referred to as narrow sense and have a specific structure or function to be named as "AR" device. In fact, any type of electronic device that can combine the virtual image with the real image or combine the real image with the virtual image to produce a real image overlapped with a virtual image may belong to the AR glasses or AR system broadly defined in the disclosure.

Although the disclosure has been disclosed in the above embodiments, the embodiments are not intended to limit the disclosure, any person ordinarily skilled in the art can make some altercation and modification without deviating from the spirit and scope of the disclosure. The protective scope of the disclosure should be subject to the definition of the appended claims.

What is claimed is:

1. A color compensation method, applicable to an augmented reality system having a display being light-transmissive and an image sensor, comprising:
    setting a preset object position of a virtual object with respect to an actual scene;
    capturing an image of the actual scene by using the image sensor, and mapping the image of the actual scene to a field of view (FOV) of the display to generate a background image with respect to the FOV of the display;
    performing color brightness compensation only on the virtual object that overlaps a background overlapping region corresponding to the preset object position in the background image to generate an adjusted virtual object, wherein the color brightness compensation is associated with an original color of the virtual object, a display brightness of the display, a transmittance rate of the display, an original color brightness of the background overlapping region that overlaps the virtual object, and ambient brightness of the actual scene, wherein a calibrated color brightness of the color-brightness-compensated virtual object is a difference between an original color brightness of the virtual object and a background pass-through color brightness of an actual overlapping region corresponding to the background overlapping region in the actual scene after passing through the display, wherein the original color brightness of the virtual object is computed based on the original color of the virtual object and the display brightness of the display, and wherein the background pass-through color brightness of the actual overlapping region after passing through the display is computed based on the original color brightness of the background overlapping region that overlaps the virtual object, the transmittance rate of the display, and the ambient brightness of the actual scene; and
    displaying the adjusted virtual object on the display according to the preset object position.

2. The method according to claim 1, wherein the augmented reality system further comprises a depth sensor, and wherein before the step of setting the preset object position of the virtual object with respect to the actual scene, the method further comprises:
    computing a depth map of the actual scene by using at least the depth sensor; and
    generating absolute coordinates of the actual scene by leveraging a simultaneous localization and mapping method according to the depth map.

3. The method according to claim 2, wherein the step of setting the preset object position of the virtual object with respect to the actual scene further comprises:
    setting an appearance of the virtual object; and
    setting an absolute coordinate position of the virtual object with respect to the actual scene as the preset object position.

4. The method according to claim 1, wherein the step of mapping the image of the actual scene to the FOV of the display to generate the background image with respect to the FOV of the display comprises:
obtaining the FOV of the display and a FOV of the image sensor to accordingly compute a view overlapping region, wherein the FOV of the image sensor is greater than the FOV of the display; and
mapping the view overlapping region onto the FOV of the display to generate the background image with respect to the FOV of the display.

5. The method according to claim 4, wherein the step of obtaining the FOV of the display and the FOV of the image sensor to accordingly compute the view overlapping region comprises:
computing vertical view angles and horizontal view angles of the view overlapping region with respect to the image sensor from different distances according to a preset human eye position, a disposition position of the display, and a disposition position of the image sensor; and
for each of the different distances, obtaining a range covered by the vertical angle and the horizontal angle from the FOV of the image sensor, and setting the obtained range as the view overlapping region.

6. The method according to claim 4, wherein the step of obtaining the FOV of the display and the FOV of the image sensor to accordingly compute the view overlapping region comprises:
disposing another image sensor at a preset eye position, wherein a FOV of the another image sensor is greater than the FOV of the display;
disposing a calibration board at different distances with respect to the display, wherein the calibration broad comprises a reference pattern and is greater than the FOV of the display; and
capturing a region covered by the FOV of the display in the calibration broad by using the another image sensor, and setting the captured region as the view overlapping region.

7. The method according to claim 4, wherein the step of mapping the image of the actual scene to the FOV of the display to generate the background image with respect to the FOV of the display comprises:
performing image resizing and image warping on the view overlapping region according to the FOV of the display to generate the background image.

8. The method according to claim 1, wherein the background pass-through color brightness of the actual overlapping region after passing through the display is proportional to an ambient brightness.

9. The method according to claim 8, wherein the step of determining the ambient brightness comprises:
determining the ambient brightness according to a gain value and an exposure time used by the image sensor while the image of the actual scene is being captured in an auto-exposure mode.

10. The method according to claim 1, wherein the background pass-through color brightness of the actual overlapping region after passing through the display is proportional to the ambient brightness and the transmittance rate of the display.

11. The method according to claim 1, wherein the step of performing color brightness compensation on the virtual object to generate the adjusted virtual object further comprises:
obtaining and setting a brightness value of each pixel of the color-brightness-compensated virtual object as each compensated brightness value of the virtual object;
obtaining a maximum compensated brightness value and a minimum compensated brightness value among the compensated brightness values; and
adjusting each of the compensated brightness values according to the maximum compensated brightness value and the minimum compensated brightness value to generate the adjusted virtual object.

12. The method according to claim 11, wherein the step of adjusting each of the compensated brightness values according to the maximum compensated brightness value and the minimum compensated brightness value to generate the adjusted virtual object comprises:
performing subtraction between each of the compensated brightness value and the minimum brightness value to respectively generate a shifted brightness value;
determining whether a difference between the maximum compensated brightness value and the minimum compensated brightness value is greater than a first brightness threshold;
in response to the determination being affirmative, performing normalization on each of the shifted brightness value according to the first brightness threshold and setting each of the normalized shifted brightness values as a brightness value of each pixel of the adjusted virtual object; and
in response to the determination being negative, setting each of the shifted brightness as the brightness value of each of the pixels of the adjusted virtual object.

13. The method according to claim 12, wherein the step of performing normalization on each of the shifted brightness value according to the first brightness threshold comprises:
performing normalization on the shifted brightness value based on a ratio of the first brightness threshold to a maximum shifted brightness value among the shifted brightness values.

14. The method according to claim 11, wherein the step of adjusting each of the compensated brightness values according to the maximum compensated brightness value and the minimum compensated brightness value to generate the adjusted virtual object comprises:
determining whether a difference between the maximum compensated brightness value and the minimum compensated brightness value is greater than a second brightness threshold;
in response to the determination being negative, performing subtraction between each of the compensated brightness value and the minimum compensated brightness value to respectively generate a shifted brightness value, and setting each of the shifted brightness values as a brightness value of each pixel of the adjusted virtual object; and
in response to the determination being affirmative, adjusting each of the compensated brightness values to an interval between 0 and the second brightness threshold, and setting each of the adjusted compensated bright values as the brightness value of each of the pixels of the adjusted virtual object.

15. The method according to claim 14, wherein the step of adjusting each of the compensated brightness values to an interval between 0 and the second brightness threshold comprises:
for each of the compensated brightness values:
determining whether the compensated brightness value is less than 0;
in response to the determination being affirmative, adjusting the compensated brightness value to be 0, and setting the adjusted compensated brightness value to a brightness value of a corresponding pixel of the adjusted virtual object; and in response to the determination being negative, computing a difference between the maximum compensated brightness value and the second brightness threshold, performing shifting on the compensated brightness value according to the difference, and setting the shifted compensated brightness value as the brightness value of the corresponding pixel of the adjusted virtual object.

16. The method according to claim 1, wherein the original color brightness of the virtual object is associated with a multiplication of the original color of the virtual object and the display brightness of the display.

17. The method according to claim 1, wherein the background pass-through color brightness of the actual overlapping region after passing through the display is associated with a multiplication of an original color brightness of the background overlapping region that overlaps the virtual object and a first factor associated with the transmittance rate of the display and the ambient brightness of the actual scene.

18. An augmented reality system comprising:
an image sensor, configured to capture an image of an actual scene;
a display being light-transmissive, configured to display a virtual object; and
a computing device, electrically connected to the image sensor and the display directly or indirectly, and configured to:
set a preset object position of the virtual object with respect to the actual scene;
map the image of the actual scene to a field of view (FOV) of the display to generate a background image with respect to the FOV of the display;
perform color brightness compensation only on the virtual object that overlaps a background overlapping region corresponding to the preset object position in the background image to generate an adjusted virtual object, wherein the color brightness compensation is associated with an original color of the virtual object, a display brightness of the display, a transmittance rate of the display, an original color brightness of the background overlapping region that overlaps the virtual object, and ambient brightness of the actual scene, wherein a calibrated color brightness of the color-brightness-compensated virtual object is a difference between an original color brightness of the virtual object and a background pass-through color brightness of an actual overlapping region corresponding to the background overlapping region in the actual scene after passing through the display, wherein the original color brightness of the virtual object is computed based on the original color of the virtual object and the display brightness of the display, and wherein the background pass-through color brightness of the actual overlapping region after passing through the display is computed based on the original color brightness of the background overlapping region that overlaps the virtual object, the transmittance rate of the display, and the ambient brightness of the actual scene; and
display the adjusted virtual object on the display according to the preset object position.

19. The augmented reality system according to claim 18 further comprising:
a depth sensor, wherein the computing device computes a depth map of the actual scene by using at least the depth sensor, generates absolute coordinates of the actual scene by leveraging a simultaneous localization and mapping method according to the depth map, and stores the absolute coordinates of the actual scene.

20. The augmented reality system according to claim 18, wherein the computing device further determines the ambient brightness according to a gain value and an exposure time used by the image sensor while the image of the actual scene is being captured in an auto-exposure mode.

21. A color compensation method, applicable to an apparatus having an image sensor and a display being transparent and able to display a virtual object, wherein the virtual object has an original color, and wherein the method comprises:
capturing an image of an actual scene by using the image sensor to generate a background image;
comparing the virtual object of the display and the background image to determine an actual overlapping region of the virtual object and the background image;
determining a relationship between a background pass-through color brightness of the actual overlapping region of the background image after passing through the display and an original color brightness of the virtual object; and
only adjusting the original color brightness of the virtual object to a calibrated color brightness based on the relationship, an original color of the virtual object, a display brightness of the display, a transmittance rate of the display, an original color brightness of the background overlapping region that overlaps the virtual object, and ambient brightness of the actual scene, wherein the calibrated color brightness of the color-brightness-adjusted virtual object is a difference between the original color brightness of the virtual object and a background pass-through color brightness of an actual overlapping region corresponding to the background overlapping region in the actual scene after passing through the display, wherein the original color brightness of the virtual object is computed based on the original color of the virtual object and the display brightness of the display, and wherein the background pass-through color brightness of the actual overlapping region after passing through the display is computed based on the original color brightness of the background overlapping region that overlaps the virtual object, the transmittance rate of the display, and the ambient brightness of the actual scene.

* * * * *